July 16, 1957 J. S. WISHART 2,799,395
THERMAL DIFFUSION APPARATUS
Filed April 23, 1954

INVENTOR.
JAMES S. WISHART
BY
ATTORNEY

United States Patent Office 2,799,395
Patented July 16, 1957

2,799,395

THERMAL DIFFUSION APPARATUS

James S. Wishart, Cleveland Heights, Ohio, assignor to The Standard Oil Company, Cleveland, Ohio, a corporation of Ohio Application April 23, 1954, Serial No. 425,154

2 Claims. (Cl. 210—176)

The present invention relates to liquid thermal diffusion apparatus and, more particularly, to novel and improved port construction.

Thermal diffusion is a term intended herein to define a process by which a mixture, liquid under operating conditions, is separated into two or more fractions differing in composition from the composition of the original mixture, said separation being accomplished by subjecting a thin film of the mixture which is to be separated to a temperature gradient.

In accordance with the thermal diffusion techniques disclosed in U. S. Patent No. 2,541,069, the separation chamber may be formed between two parallel surfaces maintained at substantially different temperatures which are spaced apart a small distance. A liquid mixture may then be fed into the separation chamber and the different products of the fluid that are separated within the chamber are then withdrawn from the chamber. In another flow pattern which may be used, the feed enters at one end of the separation chamber while the products are withdrawn from the opposed surfaces at the opposite extremity of the separation chamber. However, regardless of the flow pattern, it has been found in actual practice that in order to attain an increased degree of separation of the fluid within the chamber into its respective products, it is desirable to have an even distribution of the flow of the fluid into, through, and from the separation chamber. This is especially true in chambers formed by flat plates. Accordingly, the design of the feed and withdrawal ports for the feed fluid and separation products has been found to be important. The requirement of uniform fluid distribution has also been found to be significant in the use of multiple plate thermal diffusion apparatus, wherein a plurality of thermal diffusion separation chambers are arranged in parallel fashion.

It is an object of the present invention, accordingly, to provide novel and improved port structures which will meet the above requirements.

In accordance with the invention, attachments are provided which can be machined or cast apart from the plates that constitute the walls of the separation chambers. These attachments may be fitted into the separation chamber walls to provide ports having the correct apertures. These attachments may have a configuration such that reservoirs are provided adjacent the slits leading into the separation chambers when the units are assembled. These reservoirs may have a volume large in comparison with the aperture area of the slits so as to provide equal liquid pressure throughout the reservoir.

The invention will be better understood by reference to the following detailed description of several exemplary embodiments taken in conjunction with the accompanying figures of the drawing, in which.

Figure 1:
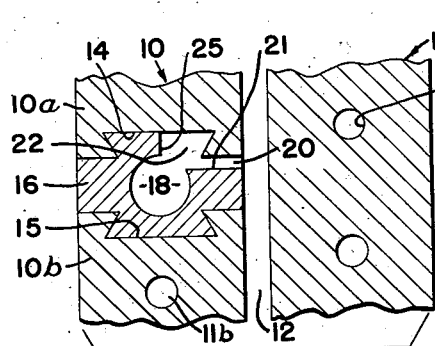
Figure 1 is a cross sectional view of a portion of a thermal diffusion separation chamber showing a port constructed in accordance with the invention.

Referring to Figure 1, the plates 10 and 11 are uniformly spaced apart to form a separation chamber 12. Means may be provided to heat one of the walls and to cool the other, such as coils 11b within the plates. The plate 10 is formed in two sections 10a and 10b, each having keyways 14 and 15 cut in their adjacent edges. The keyways 14 and 15 are adapted to receive an attachment 16, the details of which are shown in Figures 2 and 3.

The configuration of the attachment 16 is designed so as to snugly conform to the contiguous surfaces of the plates 10a and 10b. The interconnection of the plates 10a and 10b and the attachment 16 may be made fluid tight in any suitable manner.

The attachment 16 includes a conduit or passage 18 running substantially the length of the attachment 16 and preferably centrally located relative to the cross sectional area thereof. The attachment 16 may be composed of metal or any other suitable non-porous material.

Figure 2:
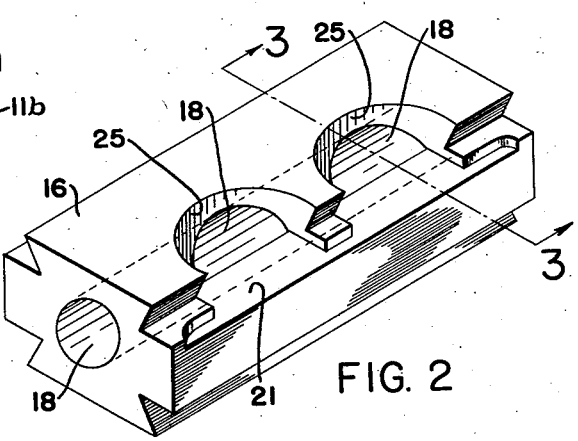
Figure 2 is an isometric view of the insert forming the port in Figure 1.
Figure 3:
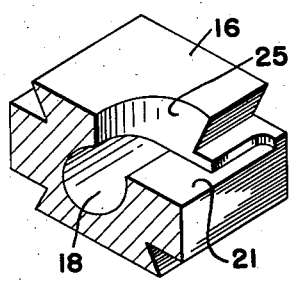
Figure 3 is a cross sectional view of the insert of Figure 2 taken along the line 3—3 and looking in the direction of the arrows.

The attachment 16 is cut out in the manner shown in Figures 2 and 3 so as to form a slot 20 (Figure 1) between the surface 21 of the attachment 16 and the juxtaposed surface of the plate 10a when the attachment 16 is positioned in the keyway 14. The attachment 16 contains further cut outs which form reservoirs 22 which are bounded by the walls 25 of the attachment 16 and the sides of the keyway 14 in the plate 10a. The configuration of the walls 25 and the surface 21 may be designed in any suitable manner so that the proper characteristics of flow are obtained, either of the fluid which is to be fed into the conduit 18 through the reservoir 22 and the slot 20 into the separation chamber 12 when the insert 16 functions as an input or feed port, or from the separation chamber 12 through the slot 20 into the reservoir 22 and the conduit 18 when the attachment 16 functions as a withdrawal or output port.

Figure 4:
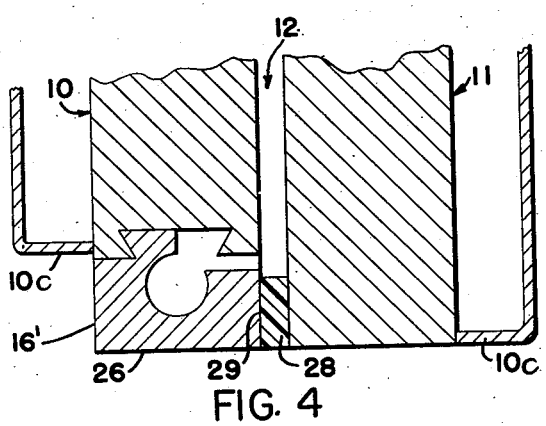
Figure 4 is a cross sectional view of an end portion of a separation chamber showing another embodiment of a port, in accordance with the invention.

If the withdrawal or feed port is to be located at the end of the separation chamber 12, an attachment 16' is employed. This has a configuration generally similar to the attachment 16, but has the side 26 opposite to the plate 10 flattened in the manner shown in Figure 4. A gasket or spacing means 28 may be positioned between the side 29 of the attachment 16' and the juxtaposed wall of the plate 11, thereby controlling the thickness of the separation chamber 12. Figure 4 also shows an alternative means for heating and cooling the plates wherein a jacket 10c is attached to the walls 10 and 11.

Figure 5:
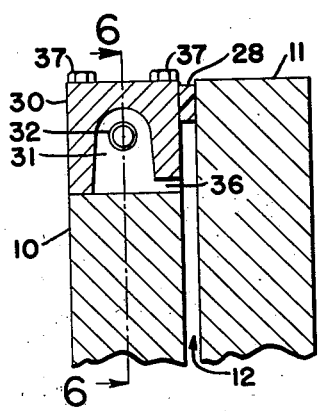
Figure 5 is a partial vertical section of a thermal diffusion unit showing an alternate type of port structure.
Figure 6:
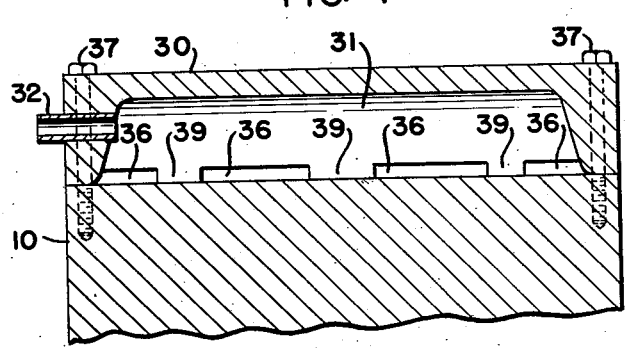
Figure 6 is a sectional view at right angles to that of Figure 5 taken along the lines 6—6 and looking in the direction of the arrows.

In Figure 5, the attachment 30 may be connected to one end of the plate 10 in any suitable manner, for example, by clamps or bolts 37. The attachment 30 includes a reservoir 31 connected with a conduit 32. The attachment 30 is made fluid tight with the end of the plate 10 by any suitable means such as a thin gasket. The attachment 30 has a configuration such that when it is in juxtaposition with the plate 10, the slot 36 is formed which communicates the reservoir 31 with the separation chamber 12. Supports 39 which are formed integrally with the attachment 30, or in the form of separate spacers, may be positioned in the slot 36 to assist in maintaining uniformity in the size of the aperture.

Thus, there has been provided novel and improved feed and withdrawal ports for use in thermal diffusion apparatus which can be easily machined to the proper tolerances so that the slots 20 and 36 are of the proper size and uniformity and may be readily assembled with its associated plates to provide ports having the correct aperture.

It will be understood by those skilled in the art that the above embodiments are meant to be merely exemplary and that they are susceptible of modification and variation without departing from the scope of the invention. For example, while keyway connections have been shown for the inserts 16 and 16' in Figures 1 and 3, it will be obvious that any other suitable type of connecting configuration may be utilized, such as square or round projections from either the plates or attachments. Further, the separate port attachments of the invention may be utilized not only in the flat plate type of thermal diffusion apparatus, but would have utility in tubular and multitubular thermal diffusion assemblies. Accordingly, the invention is not deemed to be limited except by the depended claims.

I claim:

1. A thermal diffusion apparatus comprising two vertical, spaced, relatively hot and cold plates forming therebetween a separation chamber into which a fluid is fed and subsequently withdrawn, one of said plates being divided into at least two sections along a line running horizontally of said separation chamber, said two sections having recesses formed in their opposed separated edges, elongated separable joining means lying along said opposed edges and inserted into said recesses, thereby uniting said two sections, said separable means having at least one cavity therein forming a reservoir and having a passageway from said reservoir to said separation chamber, and conduit means included in and running longitudinally of said separable member and leading from said reservoir to the outside of said separable means.

2. A thermal diffusion apparatus comprising two vertical, spaced, relatively hot and cold plates forming therebetween a separation chamber into which fluid is fed and subsequently withdrawn, a keyway along a horizontal edge of one of said plates, an elongated separable member extending longitudinally along said horizontal edge and inserted into said keyway, said separable member having cavities along at least a portion of the length thereof forming a reservoir, said separable member having a conduit extending along said reservoir and leading from said reservoir to the outside of said separable member, and said separable member having a passageway from said reservoir to said separation chamber.

References Cited in the file of this patent

UNITED STATES PATENTS

| | | |
|---|---|---|
| 868,838 | Brewington | Oct. 22, 1907 |
| 1,656,653 | Von Keller | Jan. 17, 1928 |
| 2,541,069 | Jones et al. | Feb. 13, 1951 |
| 2,541,071 | Jones et al. | Feb. 13, 1951 |
| 2,661,245 | Laber | Dec. 1, 1953 |
| 2,720,976 | Jones | Oct. 18, 1955 |